April 2, 1963 R. M. McGLAMERY 3,083,410
COLD ROLLING FILM OF HIGH DENSITY ETHYLENE POLYMER
Filed Nov. 23, 1956
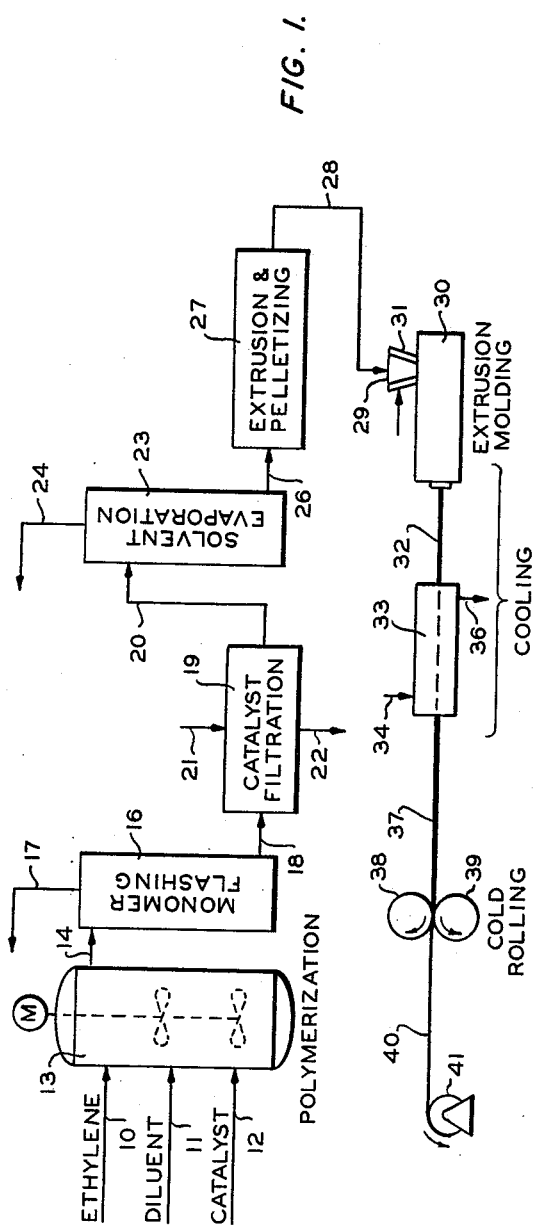
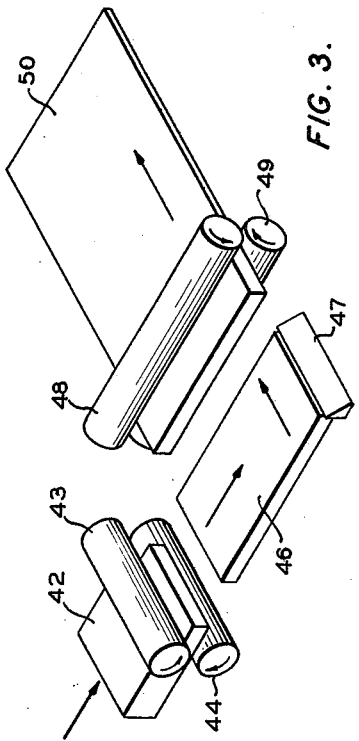
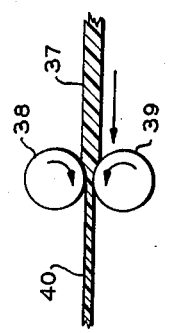
INVENTOR.
R. M. McGLAMERY
BY Hudson & Young
ATTORNEYS.

United States Patent Office 3,083,410
Patented Apr. 2, 1963

3,083,410
COLD ROLLING FILM OF HIGH DENSITY
ETHYLENE POLYMER
Roger M. McGlamery, Bartlesville, Okla., assignor to Phillips Petroleum Company, a corporation of Delaware
Filed Nov. 23, 1956, Ser. No. 623,775
6 Claims. (Cl. 18—48)

This invention relates to a method of making an improved film from ethylene polymers. In another aspect it relates to a method of increasing the tensile strength and improving other physical properties of ethylene polymer films by cold rolling.

Improved methods of polymerizing ethylene and other monoolefins have been developed which produce ethylene polymers having a relatively high tensile strength when shaped into films or fibers. These ethylene polymers can be distinguished from commercial type polyethylenes produced by processes employing high temperatures and pressures by their normally higher densities, softening temperatures and crystallinity.

I have discovered a method of improving still further the tensile strength and other physical properties of these higher softening ethylene polymers by cold rolling to produce a film of any desired thickness. I have found that a quite unexpected increase in tensile strength can be effected for films prepared from these more crystalline ethylene polymers by a severe milling step at temperatures below the softening point of said polymers so that a high percentage reduction in thickness of the initial stock is obtained. I have further discovered that these more crystalline ethylene polymers will withstand such a severe cold rolling much more readily than will polymers of the lower softening commercial type. Improvements in tensile strength and haze reduction far beyond what would normally be expected can be realized by cold rolling these ethylene polymers in two directions or by otherwise effecting a biaxial orientation thereof.

It is an object of my invention to provide a method for producing improved films, tapes, ribbons, and the like from high-density ethylene polymers. It is another object of my invention to provide a method of improving the tensile strength of such polymeric films by cold rolling. It is still another object of my invention to improve the tensile strength and clarity of such polymeric films by biaxial orientation. A further object is to provide a method of increasing tensile strength of polymeric films by a single-pass calendering at approximately room temperature. Other objects and advantages and features will be apparent to those skilled in the art from the following discussion, examples and drawing in which:

FIGURE 1 is a schematic flow diagram of the complete process, including polymerization, polymer recovery, molding and cold rolling;

FIGURE 2 is an enlarged view of the cold rolling step shown in FIGURE 1; and

FIGURE 3 is a diagram showing the biaxial cold rolling process for a slab of polymeric material.

The polymers to which my invention applies are polymers of ethylene with or without minor amounts of other acyclic monoolefins prepared by processes using relatively low temperatures and pressures. The polymers which are applicable have a density of about 0.94 and above, preferably above 0.955. These polymers have a melt index of generally not over 20 and preferably in the order of 1 to 5 and below, with a softening temperature of at least 240° F. The ethylene homopolymer has a softening temperature in the range of 250–270° F., usually about 260° F., but this is generally depressed by the incorporation of higher molecular weight comonomers. Although the ethylene homopolymer is preferred by reason of its higher softening temperature, monoolefins of from 5–12 carbon atoms are suitable as comonomers in amounts up to 3 weight percent of the total polymerizable material. The lower molecular weight monoolefins, for example, propylene, 1-butene and 2-butene or mixtures thereof, can be used as comonomers in amounts up to 15 weight percent of the total polymerizable material and still retain satisfactory properties in the finished polymer suitable for the practice of my invention.

These polymers are generally regarded as having a high degree of crystallinity as determined by nuclear magnetic resonance, generally at least 70 percent at 25° C. and preferably 80 percent and above.

These polymers likewise have a characteristic high softening temperature as discussed above. By "softening temperature" as used in this specification, I refer to the ability of the polymer to support a standard load or withstand a force at elevated temperatures without substantial deformation. "Softness" of a polymer is a measure of its relative deformation under a standard load for a certain time interval at a particular temperature. The method for determining softness as used in this specification is that described in the article by Karrer, Davis, and Dieterich in Industrial and Engineering Chemistry (Analytical Edition) 2, 96 (1930). The softening temperature for a polymer is determined by plotting softness over a range of temperatures with temperature on the abscissa. As softness increases with temperature, the slope of the curve formed by the plot likewise increases and the temperature at which the slope of the curve equals the tangent of 60° is, by definition, the softening temperature.

A method of producing these polymers is by polymerizing ethylene with or without comonomers in the presence of a catalyst comprising chromium, a portion of which is hexavalent (preferably at least 0.1 weight percent of the total catalyst) as chromium oxide associated with at least one oxide from the group consisting of silica, alumina, zirconia, and thorai. The total chromium content of the catalyst is preferably between 0.1 and 10 weight percent. Polymerization is ordinarily carried out at a temperature between 150 and 450° F. and the pressure of the reaction can vary over a wide range, for example, from atmospheric pressure to 1,000 pounds per square inch absolute. However, generally this reaction is known as low pressure polymerization. The reaction can be carried out in a gaseous phase; but with the use of a diluent, as preferred, the minimum pressure is that necessary to maintain the diluent in a liquid phase. The diluent may be any solvent which is liquid and inert under contacting conditions, such as hydrocarbon solvents, especially naphthenic hydrocarbons and paraffinic hydrocarbons of from 3–12 carbon atoms, for example, normal pentane, isopentane, isooctane, cyclohexene and methylcyclohexane. In such cases the reaction pressure is ordinarily in the range of about 100–800 pounds per square inch absolute.

The effluent withdrawn from the reactor ordinarily comprises a solution of polymer in solvent and when a slurry or suspended catalyst is used, the effluent also contains catalyst. Unreacted monomers are removed by flashing, and the effluent with or without the addition of more solvent is filtered, centrifuged or the like to remove the catalyst. The catalyst-free solution is then passed to suitable recovery steps for removal of the solvent, such as by evaporation or flashing, and the solid polymer is recovered in these steps or by precipitation. The catalyst-removal setup is optional and for some applications catalyst can be allowed to remain in the polymer. The solid polymer is ordinarily processed further in order to be placed in condition for storage. Pellets or granules are a suitable form and these can be prepared by extruding the polymer into strands which are then cut or chopped in a pelletizer.

Preparation of such polyolefins is more fully described in the copending application of Hogan and Banks, Serial No. 573,877, filed on March 26, 1956, now Patent No. 2,825,721.

While the above described process is the preferred manner of preparing the polymers for my invention, any process which will yield a polymer having the required physical characteristics is satisfactory. For example, another suitable method is a low temperature, low pressure process in which the polymerization is effected in the presence of catalyst systems which preferably comprise an organometal derivative as one component. Such catalyst compositions can have two or more components, one component being an organometal compound, metal hydride, or a group I, II, or III metal and the other component being a compound of a group IV to VI metal. With certain of the above two component systems, an organic halide having 30 of less carbon atoms per molecule or a metal halide can be used advantageously as a third catalyst component. Specific examples of suitable catalyst systems are triethylaluminum and titanium tetrachloride, mixtures of ethylaluminum halides and titanium tetrachloride, titanium tetrachloride and sodium or manganese, and titanium tetrachloride with lithium aluminum hydride and ethyl bromide.

In preparing the films for my invention the polymer must first be shaped into a form which is suitable for calendering or cold working on a roll mill. For this purpose the polymer can be shaped into a slab, sheet, or the like by any of a number of operations suitable for working the polymer while above its softening point, for example, by compression molding, injection molding or extrusion. A polymeric material thus formed into a slab, sheet, tape, ribbon, or the like is cooled below its softening temperature and processed by cold rolling in a roll mill.

The temperature at which this calendering operation is effected can vary over a wide range, the upper temperature being substantially below, for example, about 10 to 15° below the softening point of the polymer. Although the cold working operation can be effected quite satisfactorily within a temperature range of about 100 to 175° F., it is preferred to operate at about room temperature for convenience, economy and ease of control. The setting of the roll mills should be such as to effect a substantial reduction in thickness of the polymer stock on a single pass through the mills. To realize full advantage of my invention, this thickness reduction per pass should be at least about 50 percent and preferably above about 60 percent. In other words, the degree of roll-down per pass in order to effect marked improvements in tensile strength should be such that the final thickness is not greater than 50 percent, and preferably not greater than 40 percent, of the original thickness.

Referring to FIGURE 1 of the drawing for a further description of the process, feed streams of ethylene, diluent and catalyst are introduced through lines 10, 11 and 12 respectively into polymerization reactor 13 wherein polyethylene is formed having the essential characteristics above described. Reactor effluent flows through line 14 to monomer flashing zone 16 where unreacted ethylene is removed through line 17 for reuse in the process. Polymer, solvent and catalyst pass through line 18 to catalyst filtration step 19, which is an optional step as the catalyst can be allowed to remain in the polymer.

When the filtration step is used, solvent and polymer leave through line 20 and the catalyst is removed from the filtration equipment by a flushing solvent entering by line 21 and leaving through line 22. Solvent is removed from the polymer in solvent evaporation step 23, the solvent vapors being removed overhead through line 24 and recovered for reuse in the process. Polymer passes through line 26 to an extrusion pelletizing step 27 which places the polymer in condition for storage, shipping or molding. Polymer pellets thus formed pass by conduit 28 to extruder hopper 29 of extruder 30. Hopper 29 is heated by steam jacket 31 so that the polymer is heated above its softening temperature to a fluid state which can be readily molded into a tape or film. Extruded tape 32 leaves the extruder 30 and is cooled in the air space and water bath 33 into which cooling water enters by line 34 and leaves through line 36. Tape 37 thus cooled below its softening temperature is passed through rolls 38 and 39 which effect the cold rolling step above described. The cold rolling is severe enough to effect a reduction in thickness of the polymer tape of at least about 60 percent. The cold rolled tape 40, which has greatly increased tensile strength, is wound upon a spool 41 which rotates at a speed required to take up the extra length of tape which is formed as a result of the roll down by rolls 38 and 39. An enlarged view of the cold rolling step is shown in FIGURE 2 in which the cooled tape 37 passes through rolls 38 and 39 to form the cold rolled tape 40 of greatly reduced thickness.

While advantages can be gained by calendering in a single direction, further improvements in tensile strength and film clarity can be realized by biaxial cold rolling. This is done by first calendering the polymer stock in one direction and then passing the material through the roll mills so that cold rolling will be effected in a direction 90° to the original direction. To put it another way, the polymer stock is cold rolled in a first direction and secondly in a transverse direction. Such a treatment effects a biaxial orientation and produces many desirable results such as increased tensile strength, reduced haze, decreased modulus of elasticity and a considerably reduced flex temperature. Films produced by the method described have a smooth, flat surface in sharp contrast to the commercial polyethylenes processed under comparable cold rolling conditions.

FIGURE 3 shows an isometric view of the biaxial cold rolling step in which a slab of polymer is cold rolled first in longitudinal direction and then in a transverse direction. Slab of polymer 42 is passed through rolls 43 and 44 to effect a reduction of thickness at at least about 60 percent and product slab 46. Slab 46 coming from rolls 43 and 44 hits stop 47 and is moved at right angles by conveyors not shown through rolls 48 and 49 which cold roll the slab in a direction at right angles to the cold rolling performed by rolls 43 and 44. The end product is a slab of polymer 50 which has improved tensile strength in both its longitudinal and transverse directions and has a thickness of not over 40% of slab 46.

To further clarify the processes of my invention, the following examples are presented.

EXAMPLE I

Ethylene was polymerized in a continuous process in a 60-gallon reactor equipped with a stirrer in the presence of a chromia-silica-alumina catalyst. Reaction conditions were as follows:

Temperature, °F _____ 279
Pressure, pounds per square inch gage _____ 420
Catalyst concentration in reactor, weight percent ____ 0.4
Polymer concentration in reactor, weight percent ___ 9.0
Chromium (as chromium oxide) in catalyst, weight percent _____ 2.5
Cyclohexane feed rate, pounds per hour _____ 121
Ethylene feed rate, standard cubic feet per hour ____ 272
Residence time, hours _____ 2.9

After separation of catalyst and solvent a polymer product was recovered having the following properties:

Density _____ 0.961
Crystalline freezing point °F.[1] _____ 252
Melt index [2] _____ 0.65
Injection molded:[3]
   Tensile, pounds per square inch _____ 4600
   Elongation, percent [4] _____ 60
Compression molded:
   Tensile, pounds per square inch _____ 4545
   Elongation, percent _____ 20
Impact strength, Izod [5] _____ 4.25
Crystallinity at 25° C., percent [6] ___ >92
Softening temperature, °F.[7] _____ 260±2

[1] Determined on a cooling curve; frequently designated as melting point.
[2] ASTM D1238-52T.
[3] ASTM D638-52T.
[4] ASTM D412-51T.
[5] ASTM D256-47T.
[6] As determined by nuclear magnetic resonance.
[7] Determined as described in the discussion above.

Sheets were prepared by cold calendering compression molded slabs of the ethylene polymer. The work was done on a Bolling three-roll calender which was operated at room temperature (68–86° F.). The rolls were 8 inches in diameter and they were run at a speed of 11 revolutions per minute. The amount of mechanical treatment is expressed as percent extension in the direction of rolling and percent reduction in thickness. Rolling was done in both directions, i.e., at 90 degree angles to each other. A single pass of the material was made through the calender in each direction. Results on five samples of different thickness and on a sample which was not calendered (sample 6) are shown in Table I.

Table I

|  | 1 | 2 | 3 | 4 | 5 | 6 |
|---|---|---|---|---|---|---|
| Initial stock thickness, inches | 0.036 | 0.050 | 0.065 | 0.120 | 0.190 | 0.065 |
| Extension on calender, percent: |  |  |  |  |  |  |
|   First direction | 83.3 | 200 | 183 | 233 | 233 | ------ |
|   Second direction | 83.3 | 83 | 100 | 233 | 233 | ------ |
| Thickness reduction, percent: |  |  |  |  |  |  |
|   On first pass | 45 | 67 | 65 | 70 | 70 | ------ |
|   On second pass [1] | 45 | 45 | 50 | 70 | 70 | ------ |
| Tensile strength, pounds per square inch: |  |  |  |  |  |  |
|   First direction | 5,220 | 6,623 | 11,600 | 8,216 | 13,966 | 4,541 |
|   Second direction | 5,483 | 4,893 | 4,620 | 6,040 | 6,713 | ------ |
| Elongation, percent: |  |  |  |  |  |  |
|   First direction | 246 | 117 | 70 | 143 | 57 | 20 |
|   Second direction | 330 | 240 | 413 | 137 | 267 | ------ |
| Tear, grams per mil: |  |  |  |  |  |  |
|   First direction | 640 | 770 | 875 | 720 | 740 | ------ |
|   Second direction | 680 | 570 | 350 | 630 | 376 | ------ |
| Density | 0.955 | 0.956 | 0.948 | 0.951 | 0.945 | 0.961 |

[1] Based on thickness of reduced stock after first pass.

Substantial reductions in haze are obtained as a result of the calendering treatment. Each of the oriented films had a smooth, regular surface. The percent thickness reduction in Table I and the data of the other examples is an overall reduction calculated from the measured extension of the stock upon calendering. The increase in tensile strength for the high density ethylene polymer upon biaxial cold rolling is well shown by the above data, particularly when the percent reduction in thickness is above about 50 percent.

EXAMPLE II

Compression molded slabs of the ethylene polymer described in Example I, 0.065 inch in thickness, were formed into sheets by cold calendering on a Bolling three-roll calender operated at temperatures varying from 120 to 170° F. The amount of mechanical treatment is expressed as percent extension in the direction of rolling and percent reduction in thickness. Rolling was done in both directions as described in the preceding example. The oriented films had smooth, regular surface. Results on four samples are shown in Table II.

Table II

|  | 1 | 2 | 3 | 4 |
|---|---|---|---|---|
| Roll temperature, °F | 120 | 150 | 155 | 170 |
| Extension on calender, percent: |  |  |  |  |
|   First direction | 233 | 350 | 216 | 400 |
|   Second direction | 66 | 100 | 200 | 193 |
| Thickness reduction, percent: |  |  |  |  |
|   On first pass | 70 | 78 | 68 | 80 |
|   On second pass [1] | 40 | 50 | 67 | 67 |
| Tensile strength, pounds per square inch: |  |  |  |  |
|   First direction | 10,970 | 17,500 | 8,250 | 12,230 |
|   Second direction | 9,220 | 4,450 | 4,960 | 6,875 |
| Elongation, percent: |  |  |  |  |
|   First direction | 70 | 53 | 183 | 60 |
|   Second direction | 420 | 435 | 380 | 190 |
| Tear, grams per mil: |  |  |  |  |
|   First direction | 770 | 850 | 760 | 454 |
|   Second direction | 286 | 328 | 364 | 248 |
| Density | 0.946 | 0.949 | 0.950 | ------ |

[1] Based on thickness of reduced stock after first pass.

The above data show that improvements in tensile strength can be realized by biaxial rolling over a relatively broad temperature range below the softening temperature of the polymer.

EXAMPLE III

Compression molded slabs of the ethylene polymer described in Example I, 0.060 inch in thickness, were formed into sheets by cold rolling on a small differential roll mill. The mill rolls were operated at room temperature with a single pass of the material being made through the mill in each direction. The following data show the decrease in flex temperature and modulus of elasticity as a result of the cold rolling treatment:

Table III

|  | Treated by cold rolling | Control |
|---|---|---|
| Extension on roll mill, percent: |  |  |
|   First direction | 33 | ------ |
|   Second direction | 33 | ------ |
| Thickness reduction, percent: |  |  |
|   On first pass | 25 | ------ |
|   On second pass [1] | 25 | ------ |
| Tensile strength, pounds per square inch: |  |  |
|   First direction | 4,493 | 4,541 |
|   Second direction | 4,720 | ------ |
| Elongation, percent: |  |  |
|   First direction | 100 | 20 |
|   Second direction | 42 | ------ |
| Modulus of elasticity: |  |  |
|   First direction | 42,000 | 155,000 |
|   Second direction | 52,500 | ------ |
| Flex temperature, °F.: |  |  |
|   First direction | −20 | +70 |
|   Second direction | −1 | ------ |

[1] Based on thickness of reduced stock after first pass.

The data of this example demonstrate that physical properties other than tensile strength can be modified by a comparatively mild cold rolling treatment.

EXAMPLE IV

The transparency of a film of the ethylene polymer described in Example I, produced by biaxial rolling was compared with a compression molded sample of the same thickness. The results were as follows:

Table IV

|  | Biaxially rolled film | Compression molded |
|---|---|---|
| Thickness, inches | 0.004 | 0.004 |
| Haze, percent | 27.7 | 68 |

The improvement in film clarity effected by the process of my invention is quite evident from the above data.

EXAMPLE V

Compression molded slabs of the ethylene polymer described in Example I, 0.060 inch in thickness, were formed into sheets by cold rolling on a differential roll mill. The mill rolls were operated at room temperature (around 68–86° F.). The rolls were seven inches in length and three inches in diameter. The back roll was operated at 32 revolutions per minute and the front roll at 30 revolutions per minute. The amount of rolling is expressed as percent extension in the direction of the rolling and the thickness reduction is a calculated average reduction based on the extension. Rolling was done in the manner described in the preceding examples with the exception that a single pass of the material was made through the roll mill in one direction only. The surfaces of the calendered sheets were smooth and regular. The results are shown in Table V.

*Table V*

| | 1 | 2 | 3 | 4 | 5 |
|---|---|---|---|---|---|
| Extension, percent | 39 | 65 | 90 | 125 | 260 |
| Thickness reduction, percent | 28 | 39 | 47 | 55 | 72 |
| Tensile strength, pounds per square inch | 4,840 | 50,50 | 5,400 | 6,250 | 8,250 |
| Elongation, percent | 60 | 70 | 75 | 230 | 105 |

As shown by the above data, a given percent reduction in thickness above about 50 percent reduction produces a proportionally greater increase in tensile strength than a corresponding percentage reduction below 50 percent.

EXAMPLE VI

A sample of commercial polyethylene (Bakelite DYNH) had the following properties:

| | |
|---|---|
| Melting point, ° F. | 210–214 |
| Density | 0.92 |
| Molecular weight | 21,000 |
| Tensile strength, pounds per square inch | 1,800 |
| Elongation, percent | 550 |
| Crystallinity at 25° C., percent | 65 |

A compression molded slab of the commercial polyethylene, 0.060 inch in thickness, was cold rolled on a seven-inch differential roll mill operated in the manner described in Example V. On the first pass the slab was reduced in thickness by 43 percent and on the second pass in the transverse direction by 60 percent based on the thickness of the reduced stock. A film was produced having a surface that was irregular in thickness as evidenced by bulging of the center and puckering of the edges. Numerous fissures were evidenced throughout the film. These were produced by shredding of the material as it passed through the roll mill. Thus, it is evident that commercial polyethylene does not withstand extreme cold working processes as well as the higher crystalline polymers employed for my invention.

EXAMPLE VII

Samples of polyethylenes produced by three different processes were compared to determine their ability to withstand severe cold working processes. The polyethylenes compared were polyethylene A, prepared as described below in the presence of a chromium oxide-containing catalyst; polyethylene B, a highly crystalline polymer prepared in the presence of an organometallic catalyst; and polyethylene C, a commercial polyethylene (DYNH) substantially the same as that used in Example VI.

Polyethylene A was prepared by polymerizing ethylene on a continuous basis in a 60-gallon reactor equipped with a stirrer. Reaction conditions were as follows:

| | |
|---|---|
| Temperature ° F. | 302 |
| Pressure, pounds per square inch gage | 420 |
| Catalyst concentration in reactor, weight percent | 0.07 |
| Polymer concentration in reactor, weight percent | 8.0 |
| Chromium (as chromium oxide) in catalyst, weight percent | 2.5 |
| Cyclohexane feed rate, pounds per hour | 200 |
| Ethylene feed rate, pounds per hour | 30 |
| Residence time, hours | 1.7 |

Following separation of catalyst and solvent a polymer was recovered having the following properties:

| | |
|---|---|
| Volatiles, weight percent | 0.03 |
| Ash, weight percent | 0.00 |
| Crystalline freezing point, ° F.[1] | 253±2 |
| Density | 0.961 |
| Melt index [2] | 0.76 |
| Injection molded: [3] | |
|   Tensile, pounds per square inch | 4624 |
|   Elongation, percent | 33 |
| Compression molded: [4] | |
|   Tensile, pounds per square inch | 4536 |
|   Elongation, percent | 20 |
| Impact strength, Izod, foot pounds per inch notch [5] | 3.4 |
| Heat distortion, ° F.[6] | 171 |
| Stiffness, pounds per square inch [7] | 153,300 |
| Crystallinity at 25° C., percent [8] | >92 |
| Softening temperature, ° F.[9] | 260±2 |

[1] Frequently designated as melting point; determined on a cooling curve.
[2] ASTM D1238–52T.
[3] ASTM D638–52T.
[4] ASTM D412–51T.
[5] ASTM D256–47T.
[6] ASTM D648–45T.
[7] ASTM D747–50.
[8] As determined by nuclear magnetic resonance.
[9] Determined as described in the discussion above.

Polyethylene B was a commercially available polyethylene sample prepared by a low pressure process employing an organometallic catalyst. This polyethylene had a density of 0.951 and crystallinity of 82 percent. Polyethylene C, prepared by the high pressure process, had a density of 0.92 and a crystallinity of 65 percent.

Several samples of polyethylene C were tested to determine the approximate maximum reduction possible for this material at room temperature. The results of these tests are shown in Table VI. The roll temperature for each run was maintained at about 78° F.

*Table VI*

| | Polyethylene A | Polyethylene B | Polyethylene C, samples | | | |
|---|---|---|---|---|---|---|
| | | | 1 | 2 | 3 | 4 |
| Initial thickness | 0.119 | 0.119 | 0.119 | 0.119 | 0.119 | 0.119 |
| Final thickness | 0.022 | 0.020 | 0.032 | 0.048 | 0.050 | 0.078 |
| Thickness reduction, percent | 82 | 83 | 73 | 60 | 58 | 34 |
| Appearance | (1) | (1) | (2) | (3) | (1) | (1) |

[1] Smooth.    [2] Rough and discontinuous.    [3] Slightly rough.

The above examples can be summarized as follows: As shown by Examples I and II, biaxially rolled highly crystalline ethylene polymer has greatly improved tensile strength, especially when a substantial thickness reduction is effected in each pass through the rolls. Example III shows quite well that other physical properties can be improved for particular applications by cold rolling these polymers biaxially, even with somewhat lesser reduction in thickness. Modulus of elasticity is considerably reduced and the flex temperature of the biaxially rolled film is much lower. Example IV shows the remarkable improvement in tensile strength and clarity of the film effected by biaxial rolling.

The data of Example V show that considerable tensile strength improvement is gained by cold rolling in a single direction with a reduction in thickness per pass above about 50 percent. Examples VI and VII demonstrate quite markedly the unexpected advantage of the higher crystalline polyethylene over the less crystalline commercial polymer to withstand extreme cold working processes and thereby realize the tensile strength improvements which the process of my invention imparts.

The above examples are presented for exemplary purposes only and should not be interpreted as limiting my invention unduly.

I claim:

1. In a cold rolling process wherein a sheet of thermoplastic polymer makes a single pass between rolls at a temperature below the softening temperature of said polymer to effect a reduction in thickness of said sheet above 60 percent the improvement which comprises employing as said polymer an ethylene polymer characterized by a density of at least 0.94, a softening temperature of at least 240° F. and a crystallinity at 25° C. of at least 80 percent, said ethylene polymer being a polymerizate of a monomer system containing 85 to 100 weight percent ethylene, 0 to 15 weight percent monoolefin selected from the group consisting of propylene, 1-butene and 2-butene, and 0 to 3 weight percent acyclic monoolefin having 5 to 12 carbon atoms per molecule.

2. A method according to claim 1 wherein said polymer is a copolymer of ethylene and 1-butene.

3. In a cold rolling process wherein a sheet of thermoplastic polymer makes a single pass between rolls in a first direction at a temperature below the softening temperature of said polymer to effect a reduction in thickness of said sheet above 60 percent and thereafter makes a single pass between rolls in a second direction at right angles to said first direction at a temperature below the softening temperature of said polymer to effect a reduction in thickness of the sheet rolled in said first direction above 60 percent the improvement which comprises employing as said polymer an ethylene polymer characterized by a density of at least 0.94, a softening temperature of at least 240° F. and a crystallinity at 25° C. of at least 80 percent, said ethylene polymer being a polymerizate of a monomer system containing 85 to 100 weight percent ethylene, 0 to 15 weight percent monoolefin selected from the group consisting of propylene, 1-butene and 2-butene, and 0 to 3 weight percent acyclic monoolefin having 5 to 12 carbon atoms per molecule.

4. A method according to claim 1 wherein said polymer is polyethylene characterized by a density of at least 0.955, a softening temperature of at least 250° F. and a crystallinity at 25° C. of at least 90 percent.

5. A method according to claim 1 wherein said cold rolling step is performed at about normal room temperature.

6. A method according to claim 3 wherein said polymer is polyethylene characterized by a density of at least 0.955, a softening temperature of 250° F., and a crystallinity at 25° C. of at least 90 percent.

References Cited in the file of this patent

UNITED STATES PATENTS

| | | |
|---|---|---|
| 1,908,546 | Sheppard et al. | May 9, 1933 |
| 2,244,208 | Miles | June 3, 1941 |
| 2,406,127 | Alfthan | Aug. 20, 1946 |

FOREIGN PATENTS

| | | |
|---|---|---|
| 510,145 | Canada | Feb. 15, 1955 |